United States Patent Office 2,977,707
Patented Apr. 4, 1961

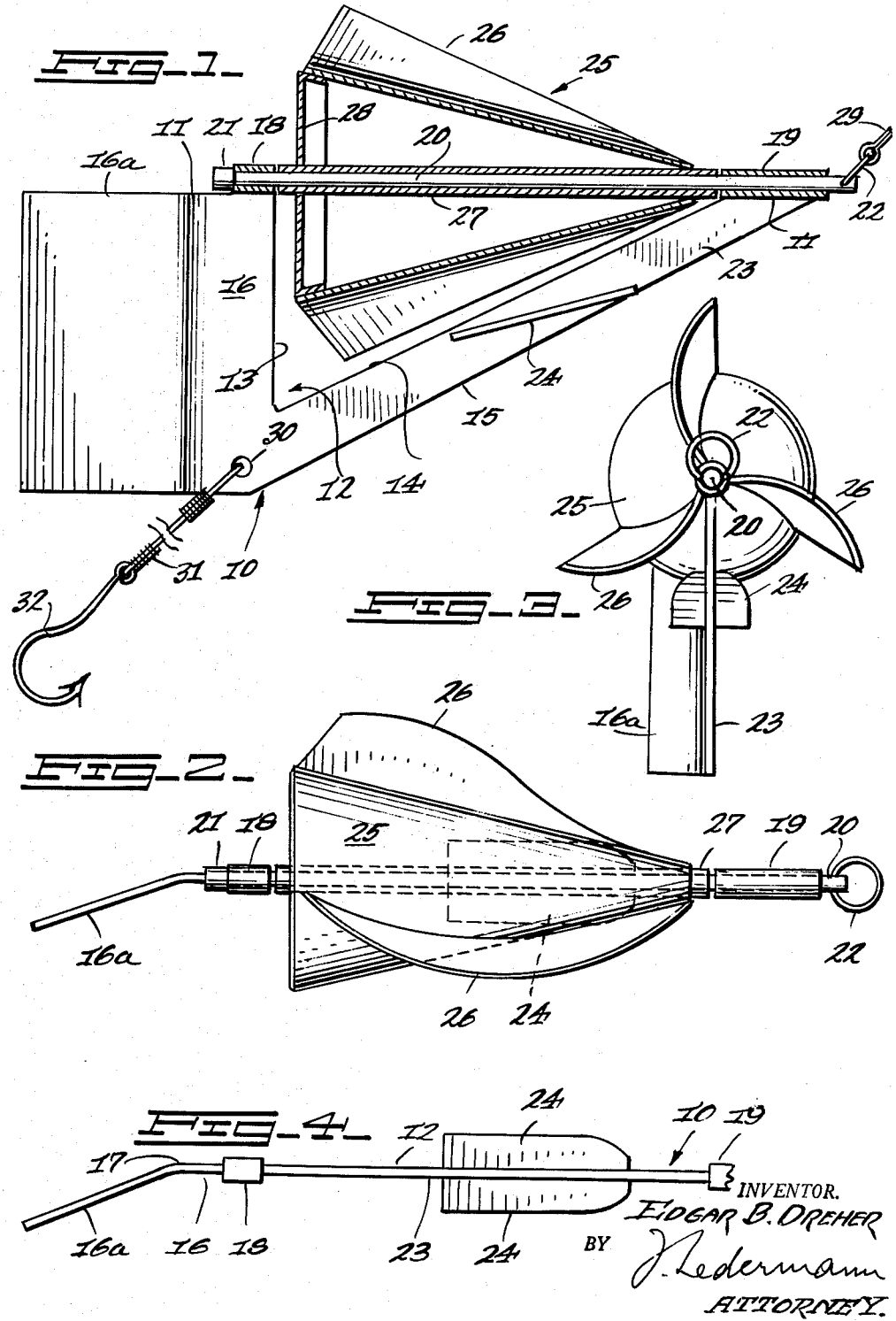

2,977,707

FISH LINE TROLLERS

Edgar Bernard Dreher, 1133 Aspent Court, Longmont, Colo.

Filed Sept. 18, 1959, Ser. No. 840,920

2 Claims. (Cl. 43—42.12)

This invention relates to sport fishermen's equipment, and an object of the invention is the provision of a new improved troller adapted to be attached at its front end to the fishing line and to have one or more hooks trailing from its rear end.

Another object of the invention is the provision of a troller for the purpose stated consisting of a normally substantially upright flat frame of suitable material such as, for example, a plastic, having a triangular cut-out in its upper edge and provided on its horizontally opposed top edges with aligned trunnions or sleeves in which a sealed hollow conical float of the same material is rotatably mounted and provided with helical fins to cause rotation of the float while the troller is moving forward in the water. Thus the device though its movement and the spinning of the float attracts the attention of fish, and at the same time tends to keep the fish line taut and clear of entanglement with the lines of other close by fishermen. The entire device except possibly for the pin on which the conical float rotates is preferably made of a suitable light weight plastic material, although even the said pin may also be made of a plastic material, if desired.

Further, the device may be made in any color or combination of colors, as desired.

The above as well as additional objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all of the exact details of construction shown or described except insofar as they may be deemed essential to the invention.

Referring briefly to the drawing, Fig. 1 is a side elevational view of a troller for fish lines, embodying features of the present invention.

Fig. 2 is a top plan view of the same.

Fig. 3 is a front elevational view of the same.

Fig. 4 is a fragmentary top plan view of the frame per se of the troller.

Referring in detail to the drawing, the numeral 10 indicates a normally upright flat frame having a horizontal top edge 11 and provided with a deep right triangular cut-out 12 extending downward through the said top edge and defined by the substantially vertical edge 13 at its rear and the sloping edge or hypotenuse 14 at its bottom. This cut-out extends over the greater portion of the frame from the forward end. The lower edge 15 of the frame also slopes and is substantially parallel with the edge 14, this edge 15 extending from a point vertically positioned rearward of the vertical edge 13, in a forward direction.

The portion 16 of the frame 10 rearward of the cut-out 12 is substantially rectangular in form, and the rear portion 16a thereof constitutes an extension which is twisted or bent at an angle to the portion 16 substantially as shown in Figs. 2 and 4, thus providing a fixedly positioned rudder. If desired, however, the rudder 16a may be pivoted on a vertical axis, not shown through the bend 17, or it might lie immovable in the plane of the frame, not shown.

Rigid on the top edge 11 on opposite longitudinal ends of of the frame, are aligned trunnions or sleeves 18 and 19, respectively, in which the ends of an elongated pin or shaft 20 register rotatably. The rear end of this pin has an enlarged head 21, and the forward end of the pin, which protrudes from the sleeve 19, has a link 22 pivotally engaged therein.

The lower upwardly sloping member of the frame defined by the edges 14 and 15, is indicated by the numeral 23. This member is provided on the sides thereof with relatively short co-planar wings or fins 24 which slope upward in a forward direction to tend to keep the troller at or near the surface of the water.

A conical airtight hollow float is indicated at 25, and is provided with circumferentially spaced helical fins 26 which serve to keep the float rotating as it drives through the water owing to the curvature of these fins. A hollow tube 27 extends axially through the base 28 and the tip of the cone. The pin 20 extends through this tube and positions the cone rotatably in the cut-out 12.

A fish line 29 is adapted to be secured to the link 22 at the forward end of the pin 20. A hole 30 is provided in the frame portion 16, in which a lead 31 having a fish hook 32 thereon, is secured. Swivels or other accessory attaching means may of course be provided as desired.

It is now apparent that as the troller moves through the water the conical float 25 will rotate and will tend to keep the line taut. The bent rear end, rudder or tail 16a will tend to maintain the troller at a more or less large angle to the angle of the line 29 and to keep the troller off-set from the direction of flow of the water with respect to the fisherman or the boat in which he may be stationed. One consequence of this feature is that the lines of a number of fishermen in a boat will be kept clear of each other, and furthermore a fisherman may let out his line from a stream or river bank to the opposite shore.

Thus a practical new and improved troller for fishermen has been provided, which is efficient in operation, light in weight, and inexpensive in cost of manufacture, while supplying a need which fishermen have felt for a long time. With ordinary fishing equipment the lines of several fishermen in a boat are constantly and repeatedly becoming entangled, with understandable displeasure and inconvenience as well as the loss of valuable moments while the fish are running, spent in untangling lines.

Obviously, modifications in form or structure may be made without departing from the spirit or scope of the invention as defined in the appended claims.

The invention having thus been described, what is claimed and desired to be secured by Letters Patent is as follows:

1. A fishing troller having front and rear ends comprising a normally substantially upright unitary substantially flat frame in the shape of a right triangle having its peak at said front end having a normally substantially horizontal top edge and a deep right-triangular cut-out extending downward through said top edge whence one side of the cut-out is coincident with said top edge, the hypotenuse and the other side of the cut-out being parallel to, respectively, the hypotenuse and other side of the frame, a trunnion positioned on said top edge at the rear end of the cut-out, a second trunnion positioned on said top edge at the front end of the cut-out in alignment with said first-named trunnion, a pin having the ends thereof mounted in said trunnions and having a conical float axially rotatably mounted thereon registering in said cut-out with the base of the float parallel with said other side of the triangular cut-out, and positioned adjacent said first-named trunnion, said pin protruding from the front end of said second trunnion and having means for securing a fish line thereto, said frame having means positioned near the rear end thereof for securing a fish hook thereto, said float having circumferentially spaced longitudinally extending fins thereon off-set from a plane through the axis of the float.

2. A troller according to claim 1, the rear end of said frame having a rearward extension at an acute angle to the remainder of the frame along a bend line normal to said top edge of the frame.

References Cited in the file of this patent

UNITED STATES PATENTS

| 2,306,692 | Flood | Dec. 29, 1942 |
| 2,574,293 | Sabin | Nov. 6, 1951 |
| 2,825,994 | Bruhn | Mar. 11, 1958 |
| 2,891,343 | Palermo | June 23, 1959 |